United States Patent
Greenberger

(10) Patent No.: US 10,445,364 B2
(45) Date of Patent: Oct. 15, 2019

(54) MICRO-LOCATION BASED PHOTOGRAPH METADATA

(71) Applicant: International Business Machines Corporation, Armonk, NY (US)

(72) Inventor: Jeremy A. Greenberger, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 15/071,404

(22) Filed: Mar. 16, 2016

(65) Prior Publication Data

US 2017/0270141 A1  Sep. 21, 2017

(51) Int. Cl.
  *G06F 17/30* (2006.01)
  *G06F 16/58* (2019.01)
  *H04W 4/021* (2018.01)
  *H04W 40/24* (2009.01)

(52) U.S. Cl.
  CPC ........ *G06F 16/5866* (2019.01); *H04W 4/021* (2013.01); *H04W 40/244* (2013.01)

(58) Field of Classification Search
  CPC .......... G06F 17/30268; G06F 16/5866; H04W 4/021; H04W 40/244
  See application file for complete search history.

(56) References Cited

U.S. PATENT DOCUMENTS

| | | | |
|---|---|---|---|
| 6,653,976 B1 * | 11/2003 | Janky | ........... G01S 19/11 342/357.31 |
| 7,474,959 B2 | 1/2009 | Singh | |
| 7,765,184 B2 | 7/2010 | Makela | |
| 7,924,149 B2 | 4/2011 | Mendelson | |
| 7,933,895 B2 * | 4/2011 | Amjadi | ........... G06F 17/30864 705/14.1 |

(Continued)

FOREIGN PATENT DOCUMENTS

| EP | 2767845 A1 | 8/2014 |
|---|---|---|
| WO | 2014204463 A1 | 12/2014 |

OTHER PUBLICATIONS

Chen et al., "Image based information access for mobile phones", IEEE, International workshop on Content-Based Multimedia Indexing (CBMI), Jun. 23-25, 2010, pp. 1-5.

(Continued)

*Primary Examiner* — Miranda Le
(74) *Attorney, Agent, or Firm* — Olivia R. Scheuer; William H. Hartwell

(57) ABSTRACT

A method, system, and computer program product for adding photograph metadata based on micro-locations of a venue are provided. A photograph is detected, wherein the photograph was taken by a user at a venue. A wireless beacon is detected, wherein the wireless beacon is associated with a micro-location in the venue. Tag information corresponding to the wireless beacon is retrieved. Metadata of the photograph is populated, based on the tag information, wherein the metadata is searchable by the user. One or more rules are determined, wherein the one or more rules define one or more categories of metadata to populate the photograph. A location of a plurality of wireless beacons at the venue is requested. A map indicating the location of each of the plurality of wireless beacons at the venue is generated.

11 Claims, 3 Drawing Sheets

(56) References Cited

U.S. PATENT DOCUMENTS

| | | | |
|---|---|---|---|
| 8,099,109 B2* | 1/2012 | Altman | G06Q 30/0207 455/456.3 |
| 8,334,901 B1 | 12/2012 | Ganick et al. | |
| 8,768,693 B2* | 7/2014 | Somekh | G06F 17/30265 348/231.4 |
| 8,781,502 B1* | 7/2014 | Middleton | G06Q 30/0261 455/456.3 |
| 8,996,305 B2* | 3/2015 | Kesar | H04W 4/185 701/438 |
| 9,058,611 B2 | 6/2015 | Saunders | |
| 9,161,168 B2* | 10/2015 | Trantow | H04W 4/023 |
| 9,183,557 B2 | 11/2015 | Patwa et al. | |
| 9,330,421 B2* | 5/2016 | Heddleston | G06Q 50/01 |
| 9,483,875 B2* | 11/2016 | Theimer | G06T 19/006 |
| 9,615,347 B1* | 4/2017 | Kerr | H04W 64/00 |
| 9,622,046 B2* | 4/2017 | Otis | H04W 4/043 |
| 9,626,697 B2* | 4/2017 | Rathus | G06Q 30/0259 |
| 9,641,969 B2* | 5/2017 | Theurer | H04W 4/02 |
| 9,661,260 B2* | 5/2017 | Turbin | H04N 5/91 |
| 2007/0067290 A1 | 3/2007 | Makela | |
| 2008/0021710 A1 | 1/2008 | Ho | |
| 2008/0033921 A1 | 2/2008 | Arrouye | |
| 2010/0023399 A1 | 1/2010 | Sahni et al. | |
| 2010/0153008 A1* | 6/2010 | Schwartz | G01C 21/20 701/408 |
| 2010/0194896 A1* | 8/2010 | Heimendinger | H04N 1/00132 348/207.1 |
| 2010/0312609 A1 | 12/2010 | Epshtein et al. | |
| 2011/0016398 A1 | 1/2011 | Hanes | |
| 2011/0044563 A1* | 2/2011 | Blose | G06F 17/30265 382/306 |
| 2011/0071911 A1 | 3/2011 | Tung et al. | |
| 2011/0189980 A1 | 8/2011 | Proulx et al. | |
| 2012/0008876 A1 | 1/2012 | Poetker et al. | |
| 2012/0115512 A1* | 5/2012 | Grainger | G01S 5/0257 455/456.3 |
| 2012/0124461 A1 | 5/2012 | Barnett et al. | |
| 2012/0200740 A1* | 8/2012 | Gum | G01S 19/14 348/231.3 |
| 2012/0250951 A1* | 10/2012 | Chen | G06F 21/6245 382/118 |
| 2014/0019264 A1 | 1/2014 | Wachman et al. | |
| 2014/0207578 A1 | 7/2014 | Doughty et al. | |
| 2014/0258271 A1 | 9/2014 | Kong et al. | |
| 2015/0052165 A1 | 2/2015 | Sauve et al. | |
| 2015/0073885 A1* | 3/2015 | Feiz-Ekbatani | G06Q 30/0261 705/14.13 |
| 2015/0116541 A1* | 4/2015 | Gilman | G06F 17/30265 348/231.5 |
| 2015/0140982 A1 | 5/2015 | Postrel | |
| 2015/0248439 A1* | 9/2015 | Ratnakar | G06F 17/30265 707/620 |
| 2015/0256899 A1 | 9/2015 | Chand et al. | |
| 2015/0269638 A1* | 9/2015 | Chatterton | G06Q 30/0281 705/5 |
| 2016/0085865 A1 | 3/2016 | Weingarten et al. | |
| 2016/0110659 A1 | 4/2016 | Skeen et al. | |
| 2016/0125473 A1 | 5/2016 | Singh | |
| 2016/0253691 A1* | 9/2016 | Dante, III | G06Q 30/0207 705/14.1 |
| 2017/0161810 A1 | 6/2017 | Nair | |
| 2017/0164316 A1* | 6/2017 | Prendergast | H04W 64/003 |

OTHER PUBLICATIONS

Graham et al., "Time as Essence for Photo Browsing Through Personal Digital Libraries", JCDL'02, Jul. 13-17, 2002, Portland, Oregon, USA. Copyright 2002 ACM 1-58113-513-0/02/0007, 10 pages.

Mell et al., "The NIST Definition of Cloud Computing", The National Institute of Standards and Technology, U.S. Department of Commerce, Special Publication 800-145, Sep. 2011, 7 pages.

"Photo Metadata", IPTC, <https://iptc.org/standards/photo-metadata/>, © 2017 International Press Telecommunications Council, printed Feb. 2, 2017, 4 pages.

Wang et al., "Argo: Intelligent Advertising by Mining a User's Interest from His Photo Collections", ADKDD'09, Jun. 28, 2009, Paris, France. Copyright 2009 ACM 978-1-60558-671-7, 9 pages.

IBM Appendix P, list of patents or patent applications treated as related, Feb. xx, 2017, 2 pages.

Original U.S. Appl. No. 15/071,404, filed Apr. 15, 2016. Application entitled: "Segmenting Mobile Shoppers".

Original U.S. Appl. No. 15/427,159, filed Feb. 8, 2017. Application entitled: "Metadata Based Targeted Notifications".

"E-Commerce Customer Segmentation", Forte Wares, White Paper, May 5, 2015, 9 pages, <https://forteconsultancy.wordpress.com/2015/05/05/e-commerce-customer-segmentation/>.

IBM, Appendix P, List of IBM Patents or Patent Applications Treated as Related, dated Apr. 21, 2017, 2 pages.

"Phot Metadata", IPTC, © International Press Telecommunications Council, Printed Jan. 26, 2016, 2 pages, <https://iptc.org/standards/photo-metadata/>.

* cited by examiner

MICRO-LOCATION BASED PHOTOGRAPH METADATA

BACKGROUND OF THE INVENTION

The present invention relates generally to the field of photograph metadata, and more particularly to adding photograph metadata based on micro-locations of a venue.

Photograph metadata is data that has been written into a digital photograph file. Multiple photographic metadata standards exist and each include different sets of data written to the photograph. Data written to the photographs may include, but is not limited to, an owner of the photograph, copyright information, contact information for the photograph owner, a camera serial number, exposure information, and GPS location indicating where the photograph was taken. In some instances, photograph metadata is searchable. In these instances, users can use photograph metadata, after the photograph is taken, to identify features of the photograph.

SUMMARY

According to one embodiment of the present invention, a method for adding photograph metadata based on micro-locations of a venue is provided. The method includes detecting, by one or more processors, a photograph, wherein the photograph was taken by a user at a venue; detecting, by one or more processors, a wireless beacon, wherein the wireless beacon is associated with a micro-location in the venue; retrieving, by one or more processors, tag information corresponding to the wireless beacon; and populating, by one or more processors, metadata of the photograph, based on the tag information, wherein the metadata is searchable by the user.

According to another embodiment of the present invention, a computer program product for adding photograph metadata based on micro-locations of a venue is provided. The computer program product comprises a computer readable storage medium and program instructions stored on the computer readable storage medium. The program instructions include program instructions to detect a photograph, wherein the photograph was taken by a user at a venue; program instructions to detect a wireless beacon, wherein the wireless beacon is associated with a micro-location in the venue; program instructions to retrieve tag information corresponding to the wireless beacon; and program instructions to populate metadata of the photograph, based on the tag information, wherein the metadata is searchable by the user.

According to another embodiment of the present invention, a computer system for adding photograph metadata based on micro-locations of a venue is provided. The computer system includes one or more computer processors, one or more computer readable storage media, and program instructions stored on the computer readable storage media for execution by at least one of the one or more processors. The program instructions include program instructions to detect a photograph, wherein the photograph was taken by a user at a venue; program instructions to detect a wireless beacon, wherein the wireless beacon is associated with a micro-location in the venue; program instructions to retrieve tag information corresponding to the wireless beacon; and program instructions to populate metadata of the photograph, based on the tag information, wherein the metadata is searchable by the user.

DETAILED DESCRIPTION

An embodiment of the present invention recognizes that metadata information is often added to photographs. Further, an embodiment of the present invention recognizes that metadata information is able to add value to a photograph. In some embodiments, metadata information is searchable, allowing a user to identify a photograph based on information stored in the metadata. For example, where metadata includes location information, a user can search a location (e.g., Paris) to find all photographs in the user's collection that were taken in Paris. An embodiment of the present invention recognizes that such search features are currently limited to macro-locations. For example, often, location metadata is limited to latitude and longitude coordinates.

An embodiment of the present invention provides searchable metadata for photographs based on micro-locations. Embodiments of the present invention use micro-location beacons to add location-based metadata to the photograph. Location-based metadata includes a physical location, weather at the location, events that happened at the time of the photograph, history of the location, etc.

Figure 1:
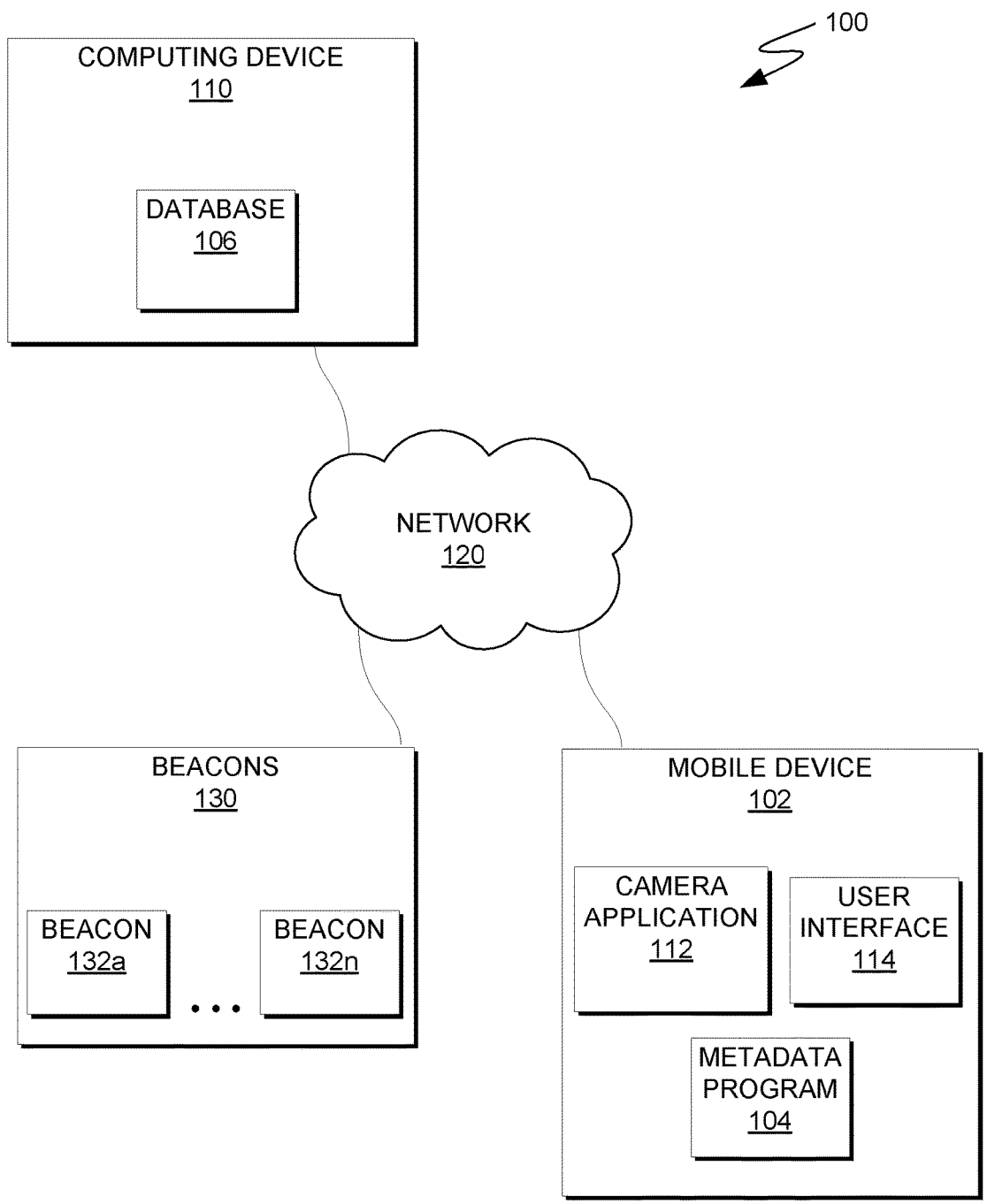
FIG. 1 is a functional block diagram illustrating a computing environment, in accordance with an embodiment of the present invention.

The present invention will now be described in detail with reference to the Figures. FIG. 1 is a functional block diagram illustrating a computing environment, in accordance with an embodiment of the present invention. For example, FIG. 1 is a functional block diagram illustrating computing environment 100. Computing environment 100 includes mobile device 102, computing device 110, and beacons 130 connected over network 120. Mobile device 102 includes metadata program 104, camera application 112, and user interface 114.

In various embodiments, mobile device 102 is a computing device that can be a standalone device, a server, a laptop computer, a tablet computer, a netbook computer, a personal computer (PC), a smart phone, or a desktop computer. Mobile device 102 has photograph taking capabilities (i.e., a camera). In another embodiment, mobile device 102 represents a computing system utilizing clustered computers and components to act as a single pool of seamless resources. In general, mobile device 102 can be any computing device or a combination of devices with access to some or all of computing device 110 and beacons 130, and with access to and/or capable of executing camera application 112 and metadata program 104. Mobile device 102 may include internal and external hardware components, as depicted and described in further detail with respect to FIG. 3.

In this exemplary embodiment, metadata program 104, camera application 112, and user interface 114 are stored on mobile device 102. In other embodiments, some or all of metadata program 104, camera application 112, and user interface 114 may reside on another computing device, provided that each can access and is accessible by beacons 130, computing device 110, and each other. In yet other embodiments, some or all of metadata program 104, camera application 112, and user interface 114 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between computing device 110, beacons 130, and mobile device 102, in accordance with a desired embodiment of the present invention.

Metadata program 104 operates to access data corresponding to a location or micro-location and populate a photograph's metadata with relevant information. In some embodiments, relevant information can include a micro-location, weather at the location, an event that happened proximate to the time the photograph was taken (e.g., retrieved by a news or data feed), event information (e.g., time, type of event, event participants, etc.), or advertisements. In some embodiments, a micro-location is a user's location within a venue. In some embodiments, a micro-location is represented on a map of the venue. In another embodiment, the micro-location is represented by coordinates established by the venue. For example, an aisle, a row, a seat, a room, etc. For example, a user's macro-location may be the GPS coordinates for a store and the user's micro-location may be the aisle of the store. Metadata added to photographs by metadata program 104 is searchable by a user. For example, where the metadata adds event information, a piece of metadata can include a team name. In this example, a user can search photographs using a search term that includes the team name to recall photographs taken at the event.

Camera application 112 operates to take photographs using a camera attached to the mobile device. Further, camera application 112 communicates with metadata program 104 to populate the photograph with location specific metadata. In some embodiments, the user interacts with camera application 112 via user interface 114 to select what metadata is added to the photograph.

Mobile device 102 includes a user interface (UI) 114, which executes locally on mobile device 102 and operates to provide a UI to a user of mobile device 102. User interface 114 further operates to receive user input from a user via the provided user interface, thereby enabling the user to interact with mobile device 102. In one embodiment, user interface 114 provides a user interface that enables a user of mobile device 102 to interact with metadata program 104. In various examples, the user interacts with camera application 112 in order to take a photograph using a camera of mobile device 102 and populate the photograph with metadata. In various example, the user interacts with metadata program 104 in order to determine relevant metadata and control the type of metadata that is populated for photographs. In one embodiment, user interface 114 is stored on mobile device 102. In other embodiments, user interface 114 is stored on another computing device (e.g., computing device 110), provided that user interface 114 can access and is accessible by at least camera application 112 and metadata program 104.

In various embodiments of the present invention, computing device 110 can each respectively be a laptop computer, a tablet computer, a netbook computer, a personal computer (PC), a desktop computer, a personal digital assistant (PDA), a smart phone, or any programmable electronic device capable of communicating with mobile device 102 via network 120. Computing device 110 includes database 106, which execute locally on computing device 110.

Database 106 is a data repository that may be written to and read by one or both of metadata program 104, beacons 130, camera application 112, and one or more computing devices (not shown) connected via network 120. Photographs and associated metadata may be stored to database 106. Further, micro-location information may be stored to database 106. In some embodiments, database 106 may be written to and read by programs and entities outside of computing environment 100 in order to populate the repository with data corresponding to the location, micro-locations, or events occurring at the location.

In various embodiments of the present invention, beacons 130 are wireless computing devices capable communicating via network 120. In some embodiments, beacons 130 communicate with mobile device 102 via a Bluetooth® network. For example, in some embodiments, beacons 130 send out intermittent signals that can be received by Bluetooth® enabled devices. In some examples, the signal includes an identification tag for the beacon. In another example, the signal includes the micro-location of the beacon. In another embodiment, beacons 130 communicate with mobile device 102 via a Wi-Fi™ network. In some embodiments, beacons 130 transmits an identification tag or a micro-location to a device that is connected to the Wi-Fi™ network. In some embodiments, beacons 130 determine transmit a micro-location to mobile device 102. For example, beacon 130a communicates an identification tag corresponding to a micro-location (e.g., a row and seat number in a stadium) based on the proximity of mobile device 102. In some embodiments, mobile device 102 communicates the location received from beacons 130 to metadata program 104 to populate location-specific metadata for a photograph. In various embodiments, beacons 130 are placed throughout a venue. A venue can be any location capable of being defined by multiple micro-locations. Example venues include, but are not limited to, a stadium, a store, a park, a mall, a museum, a theatre, etc.

In some embodiments, beacons 130 can be paired with a service that allows an operator (i.e., a venue) to record the location of the beacons (e.g., on a map or a floor plan). In some embodiments, beacon operators can assign messages or data to each beacon 130, using the service. In some embodiments, messages or data assigned to beacons 130 is populated in the metadata of a photograph, in response to a user taking a photograph within range of beacons 130.

Figure 2:
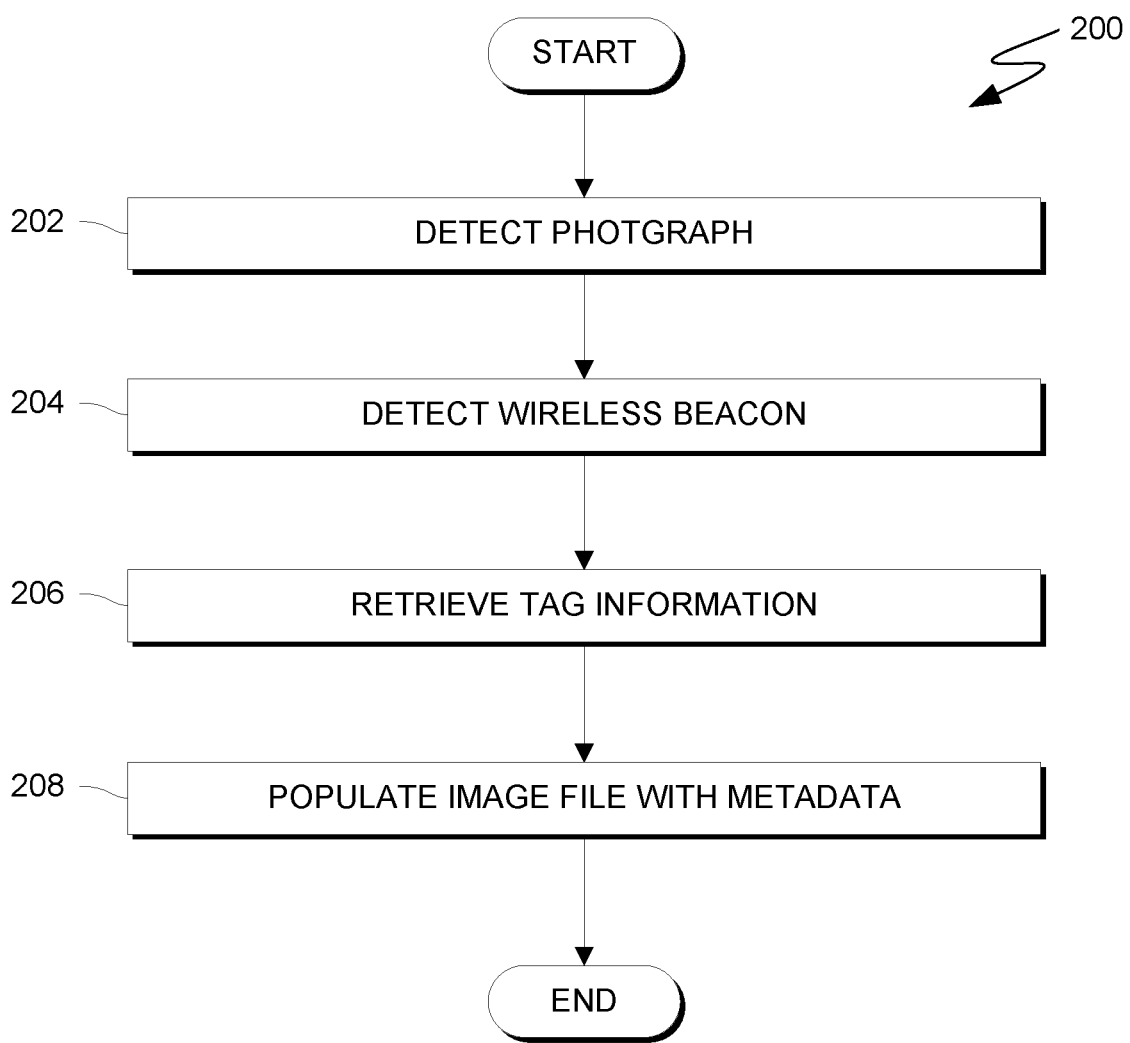
FIG. 2 is a flowchart depicting operations for adding micro-location metadata to a photograph, on a computing device within the computing environment of FIG. 1, in accordance with an embodiment of the present invention.

FIG. 2 is a flowchart depicting operations for adding micro-location metadata to a photograph, on a computing device within the computing environment of FIG. 1, in accordance with an embodiment of the present invention. For example, FIG. 2 is a flowchart depicting operations 200 of metadata program 104, on mobile device 102 within computing environment 100.

In step 202, metadata program 104 detects a photograph created by mobile device 102. In some embodiments, a photograph is taken by camera application 112 on mobile device 102. In some embodiments, metadata program 104 automatically detects an image. In another embodiment, metadata program 104 receives a notification from camera application 112 that a photograph has been taken. In some embodiments, the camera application 112 sends metadata program 104 a notification after each photograph is taken. In another embodiment, camera application 112 sends metadata program 104 a notification in response to a user request (e.g., a user interaction with user interface 114). For example, a user can select whether a photograph is populated with metadata corresponding to the micro-location.

In step 204, metadata program 104 detects a wireless beacon. For example, mobile device 102 receives a signal from a beacon through a network (e.g., Bluetooth® or Wi-Fi™) Metadata program 104 determines whether the mobile device is within range of a beacon. In some embodiments, beacons 130 communicate via a network. In some embodiments, metadata program 104 will detect more than one beacon. For example, where a location has multiple beacons 130, mobile device 102 may be within range of more than one beacon. In these embodiments, metadata program 104 determines which beacon is within the closest proximity to mobile device 102 at the time the photograph was taken. For example, based on the strength of network signal from the beacon. Metadata program 104 collects information from the beacon, such as an identification tag. In some embodiments, the beacon identification tag allows metadata program 104 to associate database information with the detected beacon. In some embodiments, the beacon identification tag can be added to the metadata to allow a user to obtain more information, or more detailed information, related to the beacon, after the metadata is populated. For example, the beacon identification tag may be used to allow a user to access news related to an event at which the photograph was taken. In some embodiments, metadata program 104 uses the beacon identification tag when communicating with a database. For example, a database is populated with information relating to each beacon (e.g., micro-location, weather, events, etc.) and metadata program 104 can access the information using the beacon identification tag. In another example, the beacon identification tag may be used to allow a user to access a coupon for a merchant, where the user photographed goods in a store.

In another embodiment, metadata program 104 requests the location and tag information for each beacon in a venue, in response to a user being within network range of a beacon. For example, where the user enters a venue (e.g., a stadium) and is within range of multiple beacons (e.g., 100), metadata program 104 requests the location and tag information of each of the beacons. In this embodiment, metadata program 104 does not have to request beacon information for each photograph. In another embodiment, metadata program 104 communicates with a database in response to connecting to a first beacon. In this embodiment, the metadata program 104 receives data on each beacon in the venue from the database. In some embodiments, knowing the predetermined beacon information allows metadata program 104 to populate the photograph metadata quicker and with fewer resources.

In step 206, metadata program 104 retrieves tag information related to the beacon location. In some embodiments, metadata program 104 uses the beacon identification tag to access a database that contains information relating to a micro-location. Based on the location of the beacon, metadata program 104 retrieves relevant metadata information from database 106. In some embodiments, the database is populated by news sources, social media streams, user input, or location specific data. For example, where the user is attending a sporting event, a news source can provide information on actions that occurred at the time the photograph was taken (e.g., a homerun was hit at the same time). Further, location specific data can include the location of the user's seat (e.g., row, seat number, etc.), teams playing at the event, or name of the location. In another example, where the user is at a store, a news source can include an advertisement (e.g., a discount for merchandise at the store). In some embodiments, a merchant may issue a promotion to the user via the metadata. For example, where a beacon places the user in a specific department (e.g., shoe department), the metadata can be populated with a discount on for the specific department (e.g., a percentage off on a shoe purchase). In some embodiments, the promotion metadata can be displayed on the photograph when the photograph is shared with a second user. In some embodiments, location specific data can include the aisle in which the user was located when the photograph was taken.

In step 208, metadata program 104 populates the photograph with metadata. Metadata program 104 populates the photograph with some or all of the information retrieved in step 206. In some embodiments, the information populated in the photograph metadata is based on a series of rules. In some embodiments, the rules are established by a user. For example, in a setup process of metadata program 104 on mobile device 102, the user pre-selects the type of information that is populated in the photograph metadata (e.g., weather, news, social media, location, etc.). In some embodiments, where the user does not specify a rule, predefined rules are used. For example, a predefined rule can state that all photographs receive micro-location metadata when a beacon is detected. In other embodiments, the rules are established by a third party. For example, the rules can be established by the owner/operator of the beacon. In one example, where the owner/operator of the beacon is a merchant, a rule can be that a coupon is attached to the photograph metadata. In another embodiment, the metadata is populated in the photograph in response to a user interaction with the user interface. For example, after the information to the beacon is retrieved, a user is issued a prompt which allows the user to select the information that is populated in the metadata.

Figure 3:
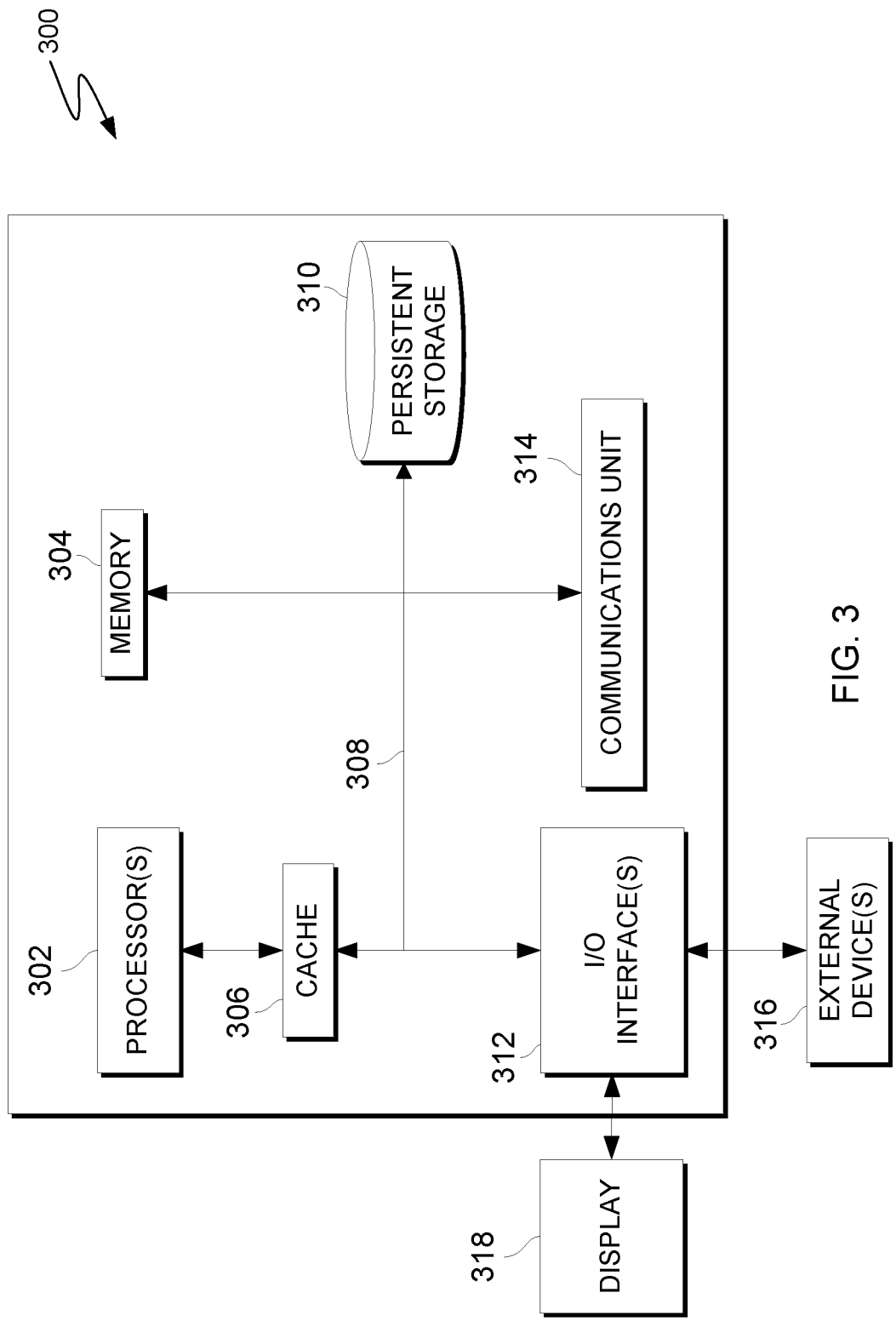
FIG. 3 is a block diagram of components of a computing device executing operations for adding micro-location metadata to a photograph, in accordance with an embodiment of the present invention.

FIG. 3 is a block diagram of components of a computing device, generally designated 300, in accordance with an embodiment of the present invention. In one embodiment, computing device 300 is representative of mobile device 102. For example, FIG. 3 is a block diagram of mobile device 102 within computing environment 100 executing operations of metadata program 104.

It should be appreciated that FIG. 3 provides only an illustration of one implementation and does not imply any limitations with regard to the environments in which different embodiments may be implemented. Many modifications to the depicted environment may be made.

Computing device 300 includes communications fabric 308, which provides communications between computer processor(s) 302, memory 304, cache 306, persistent storage 310, communications unit 314, and input/output (I/O) interface(s) 312. Communications fabric 308 can be implemented with any architecture designed for passing data and/or control information between processors (such as microprocessors, communications and network processors, etc.), system memory, peripheral devices, and any other hardware components within a system. For example, communications fabric 308 can be implemented with one or more buses.

Memory 304 and persistent storage 310 are computer-readable storage media. In this embodiment, memory 304 includes random access memory (RAM). In general, memory 304 can include any suitable volatile or non-volatile computer readable storage media. Cache 306 is a fast memory that enhances the performance of processors 302 by holding recently accessed data, and data near recently accessed data, from memory 304.

Program instructions and data used to practice embodiments of the present invention may be stored in persistent storage 310 and in memory 304 for execution by one or more of the respective processors 302 via cache 306. In an embodiment, persistent storage 310 includes a magnetic hard disk drive. Alternatively, or in addition to a magnetic hard disk drive, persistent storage 310 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 310 may also be removable. For example, a removable hard drive may be used for persistent storage 310. Other examples include optical and magnetic disks, thumb drives, and smart cards that are inserted into a drive for transfer onto another computer-readable storage medium that is also part of persistent storage 310.

Communications unit 314, in these examples, provides for communications with other data processing systems or devices, including resources of network 120. In these examples, communications unit 314 includes one or more network interface cards. Communications unit 314 may provide communications through the use of either or both physical and wireless communications links. Program instructions and data used to practice embodiments of the present invention may be downloaded to persistent storage 310 through communications unit 314.

I/O interface(s) 312 allows for input and output of data with other devices that may be connected to computing device 300. For example, I/O interface 312 may provide a connection to external devices 316 such as a keyboard, keypad, a touch screen, and/or some other suitable input device. External devices 316 can also include portable computer-readable storage media such as, for example, thumb drives, portable optical or magnetic disks, and memory cards. Software and data used to practice embodiments of the present invention (e.g., software and data) can be stored on such portable computer-readable storage media and can be loaded onto persistent storage 310 via I/O interface(s) 312. I/O interface(s) 312 also connect to a display 318.

Display 318 provides a mechanism to display data to a user and may be, for example, a computer monitor, or a television screen.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    detecting, by one or more processors, a photograph, wherein the photograph was taken by a user at a venue;
    detecting, by one or more processors, a plurality of wireless beacons, wherein each of the plurality of wireless beacons is associated with a respective micro-location of a plurality of micro-locations in the venue;
    retrieving, by one or more processors, tag information corresponding to the plurality of micro-locations in the venue;
    determining, by one or more processors, one or more rules defined by the user, wherein the one or more rules define one or more types of metadata to populate in the photograph, and wherein the one or more types of metadata are selected from the group consisting of a weather condition at the venue, one or more events occurring at the time of the photograph, an event occurring at the specific location of the photograph, a promotion associated with a subject of the photograph, and information associated with an event at the venue;
    prompting, by one or more processors, the user to select a micro-location from a list of the plurality of micro-locations;
    in response to the user selecting a micro-location, determining, by one or more processors, tag information for the selected micro-location, from the retrieved tag information, wherein the tag information for the selected micro-location is based on the one or more rules defined by the user, and wherein the one or more rules include a rule allowing a user to identify specific location-based metadata attached to the photograph;
    requesting, by one or more processors, a location of each of the plurality of wireless beacons at the venue, and generating a map indicating the location of each of the plurality of wireless beacons at the venue;
    determining, by one or more processors, the micro-location of the user based on a proximity of the user to a wireless beacon of the plurality of wireless beacons; and
    populating, by one or more processors, metadata of the photograph, based on the determined tag information for the selected micro-location, wherein the metadata is searchable by the user, and wherein the metadata includes a coordinate that relates to the selected micro-location.

2. The method of claim 1, wherein the photograph is at least one of (i) a still image, (ii) a video, and (iii) an image burst.

3. The method of claim 1, wherein the metadata includes a specific location at the venue.

4. The method of claim 1, wherein the metadata further includes an aisle in which the user was located when the photograph was taken, and wherein the method further comprises:
    in response to the photograph being shared with a second user, displaying, by one or more processors, a coupon and the aisle on the photograph.

5. A computer program product comprising:
    a computer readable storage medium and program instructions stored on the computer readable storage medium, wherein the computer readable storage medium is not a transitory signal per se, the stored program instructions comprising:
    program instructions to detect a photograph, wherein the photograph was taken by a user at a venue;
    program instructions to detect a plurality of wireless beacons, wherein each of the plurality of wireless beacons is associated with a respective micro-location of a plurality of micro-locations in the venue;
    program instructions to retrieve tag information corresponding to the plurality of micro-locations in the venue;
    program instructions to determine one or more rules defined by the user, wherein the one or more rules define one or more types of metadata to populate in the photograph, and wherein the one or more types of metadata are selected from the group consisting of a weather condition at the venue, one or more events occurring at the time of the photograph, an event occurring at the specific location of the photograph, a promotion associated with a subject of the photograph, and information associated with an event at the venue;

program instructions to prompt the user to select a micro-location from a list of the plurality of micro-locations;

program instructions to, in response to the user selecting a micro-location, determine tag information for the selected micro-location, from the retrieved tag information, wherein the tag information for the selected micro-location is based on the one or more rules defined by the user, and wherein the one or more rules include a rule allowing a user to identify specific location-based metadata attached to the photograph;

program instructions to request a location of each of the plurality of wireless beacons at the venue, and generating a map indicating the location of each of the plurality of wireless beacons at the venue;

program instructions to determine the micro-location of the user based on a proximity of the user to a wireless beacon of the plurality of wireless beacons; and program instructions to populate metadata of the photograph, based on the determined tag information for the selected micro-location, wherein the metadata is searchable by the user, and wherein the metadata includes a coordinate that relates to the selected micro-location.

6. The computer program product of claim 5, wherein the photograph is one of (i) a still image, (ii) a video, and (iii) an image burst.

7. The computer program product of claim 5, wherein the metadata includes a specific location at the venue.

8. The computer program product of claim 5, wherein the metadata further includes an aisle in which the user was located when the photograph was taken, and wherein the stored program instructions further comprise:

program instructions to, in response to the photograph being shared with a second user, display a coupon and the aisle on the photograph.

9. A computer system comprising:

one or more computer processors;

one or more computer readable storage media; and program instructions stored on the computer readable storage media for execution by at least one of the one or more processors, the stored program instructions comprising:

program instructions to detect a photograph, wherein the photograph was taken by a user at a venue;

program instructions to detect a plurality of wireless beacons, wherein each of the plurality of wireless beacons is associated with a respective micro-location of a plurality of micro-locations in the venue;

program instructions to retrieve tag information corresponding to the plurality of micro-locations in the venue;

program instructions to determine one or more rules defined by the user, wherein the one or more rules define one or more types of metadata to populate in the photograph, and wherein the one or more types of metadata are selected from the group consisting of a weather condition at the venue, one or more events occurring at the time of the photograph, an event occurring at the specific location of the photograph, a promotion associated with a subject of the photograph, and information associated with an event at the venue;

program instructions to prompt the user to select a micro-location from a list of the plurality of micro-locations;

program instructions to, in response to the user selecting a micro-location, determine tag information for the selected micro-location, from the retrieved tag information, wherein the tag information for the selected micro-location is based on the one or more rules defined by the user, and wherein the one or more rules include a rule allowing a user to identify specific location-based metadata attached to the photograph;

program instructions to request a location of each of the plurality of wireless beacons at the venue, and generating a map indicating the location of each of the plurality of wireless beacons at the venue;

program instructions to determine the micro-location of the user based on a proximity of the user to a wireless beacon of the plurality of wireless beacons; and program instructions to populate metadata of the photograph, based on the determined tag information for the selected micro-location, wherein the metadata is searchable by the user, and wherein the metadata includes a coordinate that relates to the selected micro-location.

10. The computer system of claim 9, wherein the photograph is one of (i) a still image, (ii) a video, and (iii) an image burst.

11. The computer system of claim 9, wherein the metadata further includes an aisle in which the user was located when the photograph was taken, and wherein the stored program instructions further comprise:

program instructions to, in response to the photograph being shared with a second user, display a coupon and the aisle on the photograph.

* * * * *